United States Patent Office 2,886,554
Patented May 12, 1959

2,886,554

ALUMINUM-MODIFIED PHENOLIC RESINS

Felix Schlenker, Wiesbaden, Germany, assignor to Chemische Werke Albert, Wiesbaden-Biebrich, Germany, a corporation of Germany No Drawing. Application October 16, 1953
Serial No. 386,663

Claims priority, application Germany November 10, 1952

3 Claims. (Cl. 260—53)

This invention relates to aluminum-modified phenolic resins and methods of producing the same.

In addition to phenolic resins derived from simple phenols by condensation with various aldehyde and ketone compounds, several phenolic resins modified by organic radicals have been produced, such as for example, alkyl-phenolic resins, resin-acid-modified phenolic resins and terpene-phenol resins. The degree to which the basic phenolic resin can be modified by the added radicals is limited because the substituent radicals are organic in nature, and for many purposes the degree of difference in properties is insignificant or unimportant.

The object of the present invention is to produce a new series of modified phenolic resins having many properties superior to the known plain phenolic and modified phenolic resins. More specifically, it is the purpose of the invention to produce resins capable of providing more durable films and molded compositions, as greater resistance to water or moisture and chemicals including solvents and fuel mixtures. Another object is to produce phenolic molding resins and resin compositions having superior hardening and other properties.

These and other objects are accomplished under the present invention by the provision of aluminum-modified phenolic resins. The resins are produced by the introduction of aluminum atoms into phenolic resin molecules, the said atoms entering the structure at phenolic hydroxy groups and apparently forming aluminum phenolate groups in the resin molecules.

A basic embodiment of the process of invention involves the utilization of aluminum phenolates instead of the usual or known phenolic component for condensing with the conventional or known aldehydes or ketones for the production of new phenolic resins.

An alternative and important embodiment of the invention involves the introduction of aluminum molecules into already formed intermediate phenolic resins which, as is known, always contain free phenolic hydroxyl groups.

The aluminum phenolates employed in the first embodiment can be obtained, as is generally known, from aluminum and phenol in a direct reaction. Such compounds, however, can easily be obtained from aluminum alcoholates such as aluminum-triisopropoxide and aluminum-tributoxide through "re-alcoholization" of the phenolic ingredient. The formation of the phenolate takes place under very mild conditions due to the acid character of phenols. The aluminum phenolates have high melting points and are relatively stable during storage, and therefore present no technical difficulties in their utilization in the procedure of the present invention. In the production of the phenolate, the proportion of reactants mixed together may be chosen so as to transform only part of the phenol to the phenolate thereby leaving some of the hydroxy groups in free condition. This mixture also can be advantageously used to produce modified resins of improved properties by condensation with aldehydes or ketones by the usual procedure.

The process of the invention is applicable to phenols as a class possessing the capacity of forming resinous products with aldehydes. Suitable phenolic compounds include phenol itself, cresols, xylenols, alkylphenols such as p-tertiary butylphenol, p-tertiary amylphenol, terpenephenols and the like; also diphenols like hydroquinone, resorsinol, p-p' dihydroxy diphenylmethane and its homologues and other like compounds. In addition there may be mentioned phenol alcohols, as for instance, o-hydroxylbenzyl alcohol and dihydroxy diphenyltetra alcohol as well as phenol alcohols modified by the action of monoalcohols.

For the production of the new resins from aluminum phenolates, the instant invention contemplates any and all of the known aldehydes and ketones known to form resins with phenol, which resins are referred to hereinafter in the claims as "phenolic-carbonylic resins." Examples of carbonyl condensing componds which can be used are formaldehyde, hexamethylene-tetramine, acet-aldehyde, benzaldehyde, the unsaturated aldehydes, acetone, cyclohexanone and the like. The instant invention is applicable also to the production of aluminum-modified oil-plasticized phenol resins and fatty acid-plasticized phenol resins. These resins can be produced by converting the phenolic components generally employed for the production of this type of resin into the corresponding aluminum phenolate and then reacting with the desired carbonyl-condensing compound. The instant invention also contemplates production of resin-acid-modified phenolic resins in an intermediate stage and thereafter introducing the aluminum atoms into the resin structure in accordance with the procedures hereinafter defined more in detail.

In carrying out the process of the basic embodiment of the invention, an aluminum phenolate is, either as such or in solution, mixed with the carbonyl-condensing compound, either as such or in solution, and the resulting mass is then heated under reflux to cause the condensation to take place. After completion of this reaction the resinous product formed is freed from the volatile components of the reaction mass including the solubilizing medium used, if any, by evaporation under mild temperatures with the aid of a vacuum. The aluminum-modified phenolic resins thereby obtained can then be further processed by any of the known methods.

In accordance with the second embodiment of the invention wherein the aluminum atoms are introduced into an already formed phenolic resin intermediate, an aluminum compound is introduced into the resin in a melted state and the resulting mixture is heated at a mild temperature preferably under vacuum until no more volatile materials are split off.

In this process, the aluminum-introducing compound may be an aluminum alcoholate of a monovalent alcohol, of a multivalent lower alcohol or a higher molecular alcohol, examples of which are aluminum triisopropoxide, aluminum tributoxide, and the aluminum alcoholates of the butylester of glycolic acid and of triethyleneglycol, and like compounds. In accordance with a preferred procedure the aluminum alcoholates, according to known processes are first stabilized through solution in tautomeric enol-keto compounds such as hydroxyketones, keto-acids and their esters; also hydroxyaldehydes and diketones. There may be mentioned aluminum alcoholates stabilized with unsaturated oxycarbonyl compositions such as acetoacetic ester, the diethyl ester of malonic acid, diketone alcohol, acetylacetone and as well polymeric vinylmethylketone.

An especially effective embodiment of the invention involves the introduction of the aluminum in the form of an aluminum-containing resin which may be formed according to known processes through solution and reaction of aluminum alcoholates with tautomeric enol-ketone compounds. Such resinous product can be used as such or in solution. As a variation of this embodiment, the resinous product can be treated by means of an oxidizing agent, as air or oxygen bubbled therethrough at increased temperature until desired resinous properties are obtained.

These aluminum-containing resins may be obtained for instance through the reaction of aluminum butylate with acetoacetic ester, the butyl ester (or other ester) of malonic acid, betadiketones, formalacetophenone and the like, the reaction product thereafter, if desired, being treated with air or oxygen.

The aluminum-modified phenolic resins of the present invention differ substantially in their characteristics from conventional phenolic resins. The new resins are remarkable especially with reference to the ease with which they may be hardened, such action frequently taking place at temperatures which are about 40° C. below the hardening temperature of the normal phenol resins. Furthermore the hardening operation takes less time to accomplish. These properties are of special importance in the manufacture of phenolic molding resins and phenolic resin molding compositions which contain fillers. Likewise the heat setting conditions required for the new aluminum-modified phenolic resins are substantially reduced in relation to the corresponding known benzene-hydrocarbon-soluble, plasticized phenolic resins as well as normal alcohol-soluble, hardenable resols.

The new resins of the present invention are of particular value because of their capacity for producing films of increased resistance upon exposure to chemicals and fuel mixtures. Furthermore the known modified and plasticized phenolic resins are substantially improved in their film forming characteristics through the introduction of aluminum molecules in accordance with the present invention. When the new resins are incorporated in oil varnish formulations, they impart a better drying capacity, an increased resistance to water and to chemicals.

*Example 1*

One mole of aluminum phenolate (309 g.) is dissolved in one mole of acetoacetic ester (130 g.) and to this solution, one mole of paraformaldehyde is added portionwise during heating under reflux. The resulting mixture is then heated for an extended period (2 or 3 hours) under reflux and the product obtained is then heated under vacuum at 150° C. oil-bath temperature until the solvent is removed. An easily hardened aluminum-modified phenolic resin is obtained.

*Example 2*

One mole of cyclohexanone is gradually added to one mole of melted aluminum phenolate and the resulting mixture is then heated for an extended period (about two hours) under reflux. After the volatile components have been vaporized off under vacuum, a resin is obtained which is easily hardened.

*Example 3*

One mole of aluminum cresolate is dissolved in 1.5 moles of acetoacetic ester. Thereupon one mole of paraformaldehyde is added portionwise to the resulting solution in the manner described in Example 1. Through this procedure an easily hardenable aluminum-modified phenolic resin is obtained having particularly desirable properties.

*Example 4*

An aluminum-bearing artificial resin is first formed by reacting 246 grams of aluminum butylate (1 mole) with 130 grams of acetoacetic ester (1 mole) by heating under reflux for an extended period (4 to 5 hours) and subsequently vaporizing off the volatile components under vacuum at a temperature of about 150 to 170° C.

One hundred and fifty parts by weight of a resin acid-modified phenolic resin are melted and then 48 parts by weight of the aluminum-bearing artificial resin are fed into the molten mass. The resulting mixture is stirred until a homogeneous mass is obtained while the volatile components are being distilled off under vacuum at a temperature of about 150° C. As a result, an aluminum-modified phenolic resin is obtained having a melting point from about 8 to 10° C. higher than the initial resin acid-modified phenolic resin employed. When this new resin is incorporated in an oil varnish produced without heating, a product is obtained having a substantially increased film hardness, an increased water resistance and an improved chemical stability in film coatings produced therewith.

In the foregoing example the resin acid-modified phenolic resin may be one produced under the process described in the United States Patent No. 1,623,901 wherein a heat-hardenable phenol-formaldehyde condensation product is condensed with colophony, the product of which is subsequently esterified with a multivalent alcohol such as glycerine, for example. The resin acid-modified phenolic resin may also be that sold under the trademark "Albertol 111–L."

*Example 5*

An aluminum-bearing artificial resin is prepared in the same manner as described in Example 4 but using instead one mole of aluminum triisopropoxide stabilized with 1.2 moles of malonic acid diethyl ester.

One hundred parts by weight of a terpene-phenolic resin produced by condensing terpentine oil with phenol in the presence of a boron fluoride catalyst and sold under the trademark "Alresin 191–R" are melted and thereupon 15 parts by weight of the aluminum-bearing artificial resin are incorporated in the molten mass. The mixture is made homogeneous and the volatile components are distilled off under vacuum at a temperature of about 130° C. In this manner an aluminum-modified phenolic resin having unique properties is obtained. When the resulting resin is compared with the unmodified "Alresin 191–R," the former reveals in the usual varnish formulations an increased film hardness and an improved chemical resistance and stability against water.

*Example 6*

One mole of aluminum butylate is heated under reflux with two moles of phenol for two hours and the product thus obtained is immediately thereafter condensed with one mole of paraldehyde under reflux. The volatile components of the reaction mixture are distilled off under vacuum at an oil-bath temperature of about 120° C. The product obtained is a hardenable aluminum-modified phenolic resin.

*Example 7*

Two moles of cyclohexanone are gradually added to one mole of melted aluminum cresolate and the resulting mixture is then heated for about 2 or 3 hours under reflux. Upon vaporizing off the volatile components of the reaction mass under vacuum, as easily hardenable resin is obtained.

*Example 8*

One mole of melted aluminum phenolate is dissolved in one mole of acetoacetic ester. Thereupon two moles of crotonaldehyde are added gradually to the solution while heating under reflux. The mixture is heated under reflux for three hours and subsequently the volatile components are removed by distillation under vacuum at an oil-bath temperature of 170° C. An easily hardened aluminum-modified phenolic resin is obtained.

*Example 9*

One mole of aluminum butylate is heated under reflux with one mole of acetoacetic ester for two hours whereupon two moles of o-hydroxybenzyl alcohol are gradually introduced into the reaction product during continued heating. Thereupon, one mole of paraformaldehyde is added and condensation is effected during further heating under reflux. Upon completion of the reaction, the volatile components are distilled off under vacuum.

Example 10

One mole of aluminum butylate is heated under reflux with one mole of malonic acid diethyl ester for a period of one to two hours and thereafter during further heating one mole of a tetramethylol derivative of p,p', dihydroxy diphenyl dimethylmethane is gradually introduced into the reaction product. Next, one mole of hexamethylenetetramine is added and after further condensation, the volatile components are distilled off in accordance with the procedure of Example 9.

Example 11

One hundred and eight parts by weight of technical cresol are heated to 60° C. and diluted with 200 parts by weight of a 30% aqueous formaldehyde solution and 4 parts by weight of a 25% aqueous ammonia solution. The water present is then vaporized off under vacuum at a temperature of from 50 to 60° C. To the reaction product obtained there are added 80 parts by weight of butanol and 20 parts by weight of an aluminum-bearing artificial resin derived from aluminum butylate and acetoacetic ester. Under thorough agitation then 125 parts by weight of tall oil glycerine ester are added. The reaction mixture is then subjected to heating and evaporation, and as soon as the mixture has reached a viscosity of 130 to 140 cp., it is dissolved in 85 parts by weight of xylol.

The aluminum-bearing artificial resin is obtained by heating for two hours one mole of aluminum butylate with one mole of acetoacetic ester under reflux and subsequently removing the volatile components by vacuum distillation at about 120° C.

Example 12

One hundred parts by weight of an alkyl-phenolic resin derived by the condensation of either ortho- or para-substituted phenols, as p-tert. butyl phenol with formaldehyde in the presence of alkali (sold under the trade name "Alresin 142–R") are melted and to the molten mass there are added 12.5 parts by weight of the aluminum-bearing artificial resin described below. After the resin mixture is well mixed the volatile components are distilled off under vacuum at an oil-bath temperature of 150° C.

The said aluminum-bearing resin is manufactured by heating under reflux for two hours one mole of aluminum butylate and one mole of acetoacetic ester, after which 1.5 moles of triethylene glycol are added. Finally the volatile components are distilled off under vacuum at an oil-bath temperature of 150° C.

Example 13

One mole of aluminum triisopropoxide is heated under reflux with one mole of acetoacetic ester for from 1 to 2 hours. During continued heating 5 moles of tetramethylol derivative of p,p', dihydroxydiphenyldimethyl methane are gradually introduced into the reaction mass. Thereupon 5 moles of paraformaldehyde are added in accordance with the procedure of Example 9 and after further condensation the volatile components are distilled off in a vacuum at 150° C. temperature.

Example 14

One mole of aluminum butylate is heated under reflux for two hours with one mole of acetoacetic ester. The volatile components are removed from the reaction mass under vacuum at 150° C. oil-bath temperature and thereupon oxygen is blown into the mass at a temperature of 160 to 260° C. until a test reveals that a product is obtained which possesses resin-like properties at normal temperature.

Next 100 parts by weight of an alkyl-phenol resin such as described in Example 12 or the resin known under the trade name of "Alresin 260–R" are melted and mixed with 11.2 parts by weight of the above aluminum resin. After a homogeneous mixture is obtained the mass is left to cool.

Example 15

A stabilized aluminum propylate solution is obtained by heating for two hours under reflux a mixture of one mole of aluminum propylate with 0.8 mole of acetoacetic ester.

One hundred parts by weight of a cresol novolak, produced by reacting cresol with formaldehyde in the presence of a small amount of sulfuric acid, known under the trade name of "Alnovol 429–K," are melted at a temperature of about 125° C. whereupon 18.5 parts by weight of the stabilized aluminum-propylate solution described above are added. Then the volatile components of the reaction mass are distilled off under vacuum at an oil-bath temperature of 130 to 150° C.

Example 16

One hundred weight parts of a terpene-phenolic resin known and sold under the trade name of "Alresin 214–R" are dissolved in 50 parts by weight of toluol and the solution is then mixed with 8.5 parts by weight of aluminum butylate dissolved in 15 parts by weight of toluol. After the reaction mixture is thoroughly agitated and a homogeneous mass obtained the solvent content is removed by distillation with the aid of a vacuum.

It should be understood that the present invention is not limited to the details herein given but extends to all equivalent materials, procedures and conditions of reaction which will occur to those skilled in the art upon consideration of the scope of the claims appended hereto.

I claim:

1. A process for producing hardenable aluminum-modified phenolic resins which comprises, reacting an aluminum-organic resin derived by heating the reaction product of an aluminum alcoholate and a tautomeric, enol-keto compound selected from the group consisting of acetoacetic ester, diethyl ester of malonic acid, diketone alcohol, acetyl acetone and polymeric vinyl methyl ketone, with a phenolaldehyde resin intermediate in the absence of additional curing agent, which if present would cause hardening, by heating the same under mild temperature conditions at a level below that which causes hardening, continuing the heating until no more volatile materials are split off and vaporizing off the said volatile material, thereby forming the still hardenable aluminum-modified phenolic resin in which aluminum atoms have entered the molecular structure at phenolic hydroxy groups.

2. A process for producing hardenable aluminum-modified phenolic resins which comprises, reacting a phenolaldehyde resin intermediate with an aluminum-organic resin derived by heating the reaction product of an aluminum alcoholate and a tautomeric, enol-keto compound selected from the group consisting of acetoacetic ester, diethyl ester of malonic acid, diketone alcohol, acetyl acetone and polymeric vinyl methyl ketone, followed by oxidizing the resulting reaction product until a product is obtained having resinous properties at room temperature is obtained, said reaction between said intermediate and said organic resin being carried out in the absence of additional curing agent, which if present would cause hardening, by heating the same under mild temperature conditions at a level below that which causes hardening, continuing the heating until no more volatile materials are split off and vaporizing off the said volatile material, thereby forming the still hardenable aluminum-modified phenolic resin in which aluminum atoms have entered the molecular structure at phenolic hydroxy groups.

3. A process for producing hardenable aluminum-modified phenolic resins which comprises, reacting an aluminum-organic resin derived by heating the reaction product of an aluminum alcoholate and a tautomeric, enol-keto compound selected from the group consisting of acetoacetic ester, diethyl ester of malonic acid, diketone alcohol, acetyl acetone and polymeric vinyl methyl ketone, with a phenol-aldehyde resin intermediate in a molten state, in the absence of additional curing agent, which if present would cause hardening, by heating the same under mild temperature conditions at a level below that which causes hardening, continuing the heating until no more volatile materials are split off and vaporizing off the said volatile material by heating the reaction mass under vacuum, thereby forming the still hardenable aluminum-modified phenolic resin in which aluminum atoms have entered the molecular structure at phenolic hydroxy groups.

References Cited in the file of this patent

UNITED STATES PATENTS

| | | |
|---|---|---|
| 1,150,642 | Stockhausen et al. | Aug. 17, 1915 |
| 1,697,885 | Seebach | Jan. 8, 1929 |
| 2,629,703 | Vogelsang | Feb. 24, 1953 |
| 2,742,449 | Schlenker | Apr. 17, 1956 |

FOREIGN PATENTS

| | | |
|---|---|---|
| 556,126 | Great Britain | Sept. 21, 1943 |
| 510,597 | Belgium | Apr. 30, 1952 |
| 512,974 | Belgium | June 30, 1952 |